(12) United States Patent
Inoue (10) Patent No.: US 10,889,216 B2
(45) Date of Patent: Jan. 12, 2021

(54) VEHICLE SEAT (71) Applicant: TOYOTA BOSHOKU KABUSHIKI KAISHA, Aichi-ken (JP)

(72) Inventor: Takuya Inoue, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/418,571

(22) Filed: May 21, 2019

(65) Prior Publication Data

US 2019/0359103 A1 Nov. 28, 2019

(30) Foreign Application Priority Data

May 24, 2018 (JP) ................. 2018-099786

(51) Int. Cl.
*B60N 2/68* (2006.01)
*B22D 17/00* (2006.01)

(52) U.S. Cl.
CPC ............. *B60N 2/686* (2013.01); *B22D 17/00* (2013.01); *B60N 2/682* (2013.01)

(58) Field of Classification Search
CPC .......... B60N 2/686; B60N 2/68; B60N 2/682; B60N 2/64; B60N 2/646
USPC .................................................. 297/452.18
See application file for complete search history.

(56) References Cited

U.S. PATENT DOCUMENTS

| | | | | |
|---|---|---|---|---|
| 5,372,398 A * | 12/1994 | Aneiros | ............. | B60N 2/01583 248/430 |
| 6,161,890 A * | 12/2000 | Pesta | .................. | B60N 2/01583 248/503.1 |
| 7,070,223 B2 * | 7/2006 | Jeong | ................. | B60N 2/01583 296/65.03 |
| 8,042,855 B2 * | 10/2011 | Blatseas | ............. | B60N 2/01583 296/65.11 |
| 10,442,231 B1 * | 10/2019 | Chopra | ................. | D06P 1/5292 |
| 10,625,648 B2 * | 4/2020 | Inoue | ...................... | B60N 2/68 |
| 2012/0043796 A1 * | 2/2012 | Kurachi | ............... | B60N 2/3011 297/337 |
| 2014/0265503 A1 * | 9/2014 | Thomas | .................. | B60R 22/20 297/344.13 |
| 2015/0050453 A1 * | 2/2015 | Carson, Jr. | ........ | B29C 66/12469 428/134 |
| 2019/0135137 A1 * | 5/2019 | Jameson | ................ | B60N 2/015 |
| 2019/0322199 A1 * | 10/2019 | Rasello | .................... | B60N 2/22 |

FOREIGN PATENT DOCUMENTS

JP        3527465        5/2004

* cited by examiner

*Primary Examiner* — Mark R Wendell
(74) *Attorney, Agent, or Firm* — Greenblum & Bernstein, P.L.C.

(57) ABSTRACT

A vehicle seat includes: a side frame formed by filling a mold with a material, the side frame extending along forward and backward directions and having a front lower portion and a rear lower portion; a front leg attached to the front lower portion of the side frame to support the side frame between the front lower portion and a vehicle floor surface; and a rear leg attached to the rear lower portion of the side frame to support the side frame between the rear lower portion and the vehicle floor surface.

8 Claims, 4 Drawing Sheets

VEHICLE SEAT

This nonprovisional application is based on Japanese Patent Application No. 2018-099786 filed on May 24, 2018 with the Japan Patent Office, the entire contents of which are hereby incorporated by reference.

BACKGROUND

Field

The present disclosure relates to a vehicle seat.

Description of the Background Art

Japanese Patent No. 3527465 discloses a cushion frame of a vehicle seat. This cushion frame includes side frames formed by a die casting process, which is one of processes of Filling a mold with a metallic material. Force transfer ribs and a pair of mounting bosses are provided integrally with each side frame at a lower portion of the side frame.

The paired mounting bosses are each provided with a bolt hole, into which a front end and a rear end of a slide rail are fastened by bolts. According to Japanese Patent No. 3527465, the strength of a hinge-coupled portion and an adjuster-coupled portion can be ensured to allow for size reduction by employing this disclosed configuration (configuration of the force transfer ribs).

SUMMARY

In the vehicle seat disclosed in Japanese Patent No. 3527465, the side frame formed by die casting is directly fastened to a member (in this case, the slide rail) on the vehicle side. A portion of the side frame that is fastened to the member on the vehicle side is also formed by die casting, and supports the side frame, a back frame and the like from below (hereinafter, a portion of a side frame that is fastened to a member on the vehicle side is also referred to as a "fastening support portion").

The configuration described above has the advantage of reducing the number of components since the fastening support portion is provided integrally with the side frame. In the configuration described above, however, the fastening support portion itself is formed by die casting, and the fastening support portion needs to be designed to bear a load acting on this fastening support portion formed by die casting.

When the entire side frame including a fastening support portion is to be integrally formed by die casting improving the strength of the fastening support portion causes an increase in weight and volume of the entire side frame. While aluminum and magnesium are commonly used for die casting formation, improving the strength of the fastening support portion using these metallic materials also tends to cause an increase in weight and volume.

When specifications (position, size, shape, and the like) of a fastening support portion are to be changed, there is a need to prepare a new mold for the entire side frame including the fastening support portion. When the entire side frame including a fastening support portion is integrally formed by die casting, it is also not easy to change the position, size, shape, and the like of the fastening support portion.

An object of the present disclosure is to provide a vehicle seat having a configuration capable of flexibly adapting to a specification change, such as improving the strength, of a portion fastened to a member on the vehicle side.

A vehicle seat based on the present disclosure includes: a side frame formed by filling a mold with a material, the side frame extending along forward and backward directions and having a front lower portion and a rear lower portion; a front leg attached to the front lower portion of the side frame to support the side frame between the front lower portion and a vehicle floor surface; and a rear leg attached to the rear lower portion of the side frame to support the side frame between the rear lower portion and the vehicle floor surface.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

A vehicle seat 100 in an embodiment is described below with reference to FIGS. 1 to 5. In the following description, the same and corresponding components are designated by the same reference numbers and redundant description may not be repeated.

FIGS. 1 to 5 show arrows F, B, L, R, U and D. Arrows F, B, L, R, U and D indicate frontward, backward, leftward, rightward, upward and downward directions when viewed by a passenger seated on vehicle seat 100. The upward and downward directions of vehicle seat 100 correspond to directions indicated by arrows U and D, and usually coincide with the height direction of a vehicle mounted with vehicle seat 100. A seat width direction of vehicle seat 100 corresponds to directions indicated by arrows L and R, and usually coincides with the width direction of the vehicle mounted with vehicle seat 100. The forward and backward directions of vehicle seat 100 correspond to directions indicated by arrows F and B, and usually coincide with the forward and backward directions of the vehicle mounted with vehicle seat 100.

[Vehicle Seat 100]

Figure 1:
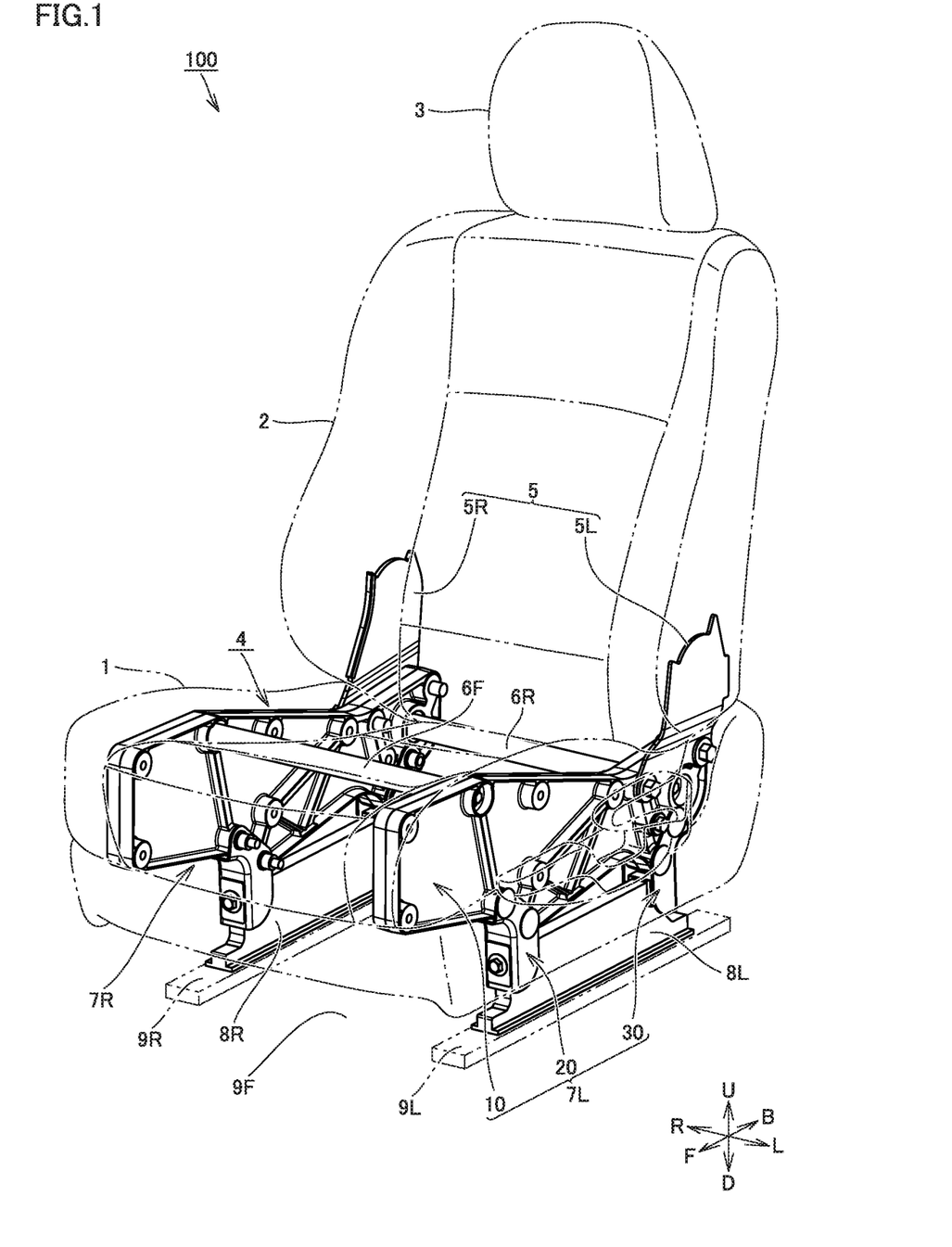
FIG. 1 is a perspective view showing a vehicle seat 100.

FIG. 1 is a perspective view showing vehicle seat 100. Vehicle seat 100 includes a seat: cushion 1, a seat back 2, a headrest 3, a cushion frame 4, and a back frame 5.

Seat cushion 1 forms a sitting surface on its upper surface, and seat back 2 forms a backrest surface on its front surface. Headrest 3 is provided on the top of seat back 2. Cushion frame 4 forms a framework of seat cushion 1, and back frame 5 forms a framework of seat back 2. As to back frame 5, side frames 5L, 5R on back frame 5 side are only partially shown for the purpose of illustration.

Cushion frame 4 includes a front frame 6F, a rear frame 6R, and a pair of frame assemblies 7L, 7R. Front frame 6F and rear frame 6R each have a cylindrical shape, and extend in the seat width direction. Front frame 6F improves the strength of cushion frame 4 at a front position of cushion frame 4, and rear frame 6R improves the strength of cushion frame 4 at a rear position of cushion frame 4.

Frame assemblies 7L, 7R each extend in the forward and backward directions, are spaced from each other in the seat width direction, and are disposed to face each other in the seat width direction. A pair of lower rails 9L, 9R are disposed in parallel on a vehicle floor surface 9F. Upper rails 8L, 8R are slidably disposed on lower rails 9L, 9R, respectively. Frame assemblies 7L, 7R are fastened to upper rails 8L, 8R, respectively (the details of which will be described later).

[Frame Assembly 7L]

Figure 2:
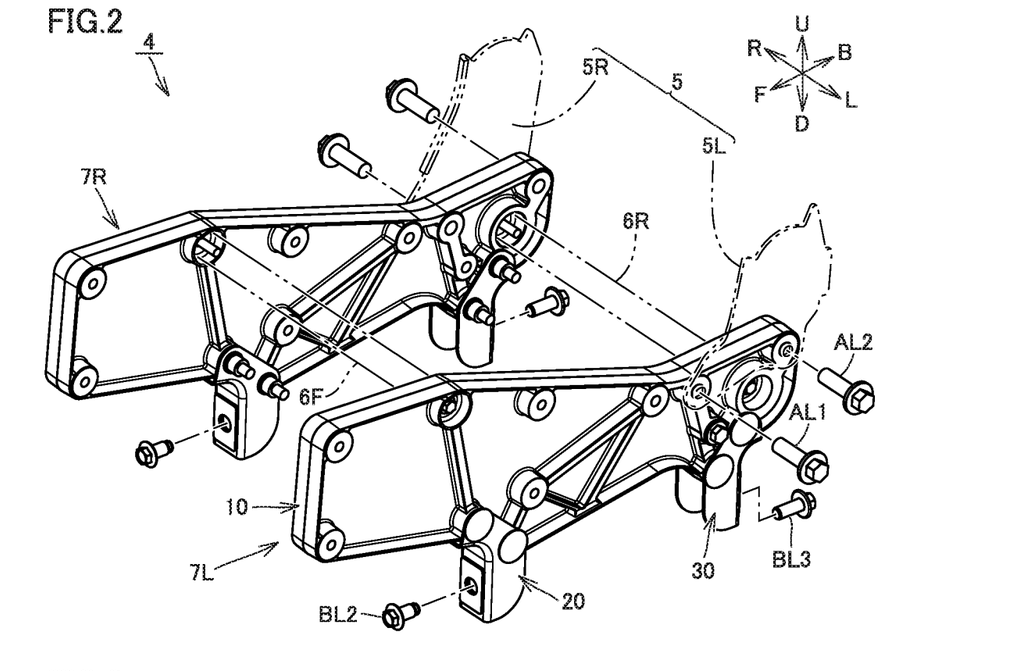
FIG. 2 is a perspective view showing a cushion frame 4 included in vehicle seat 100, representing each member visually recognized when viewed from the oblique upper left front.
Figure 3:
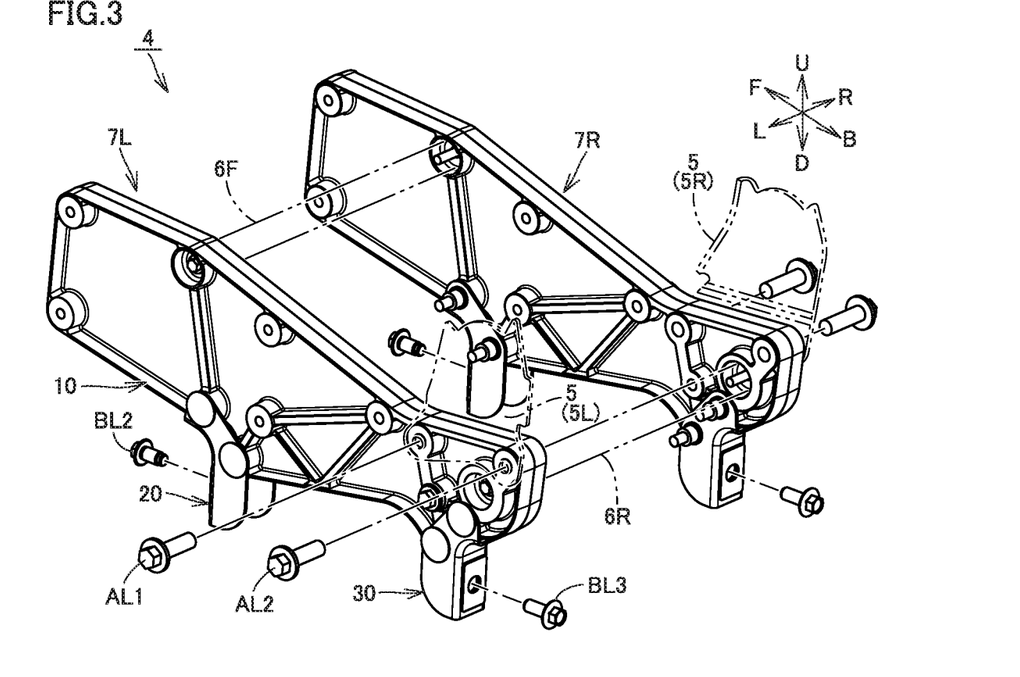
FIG. 3 is a perspective view showing cushion frame 4 included in vehicle seat 100, representing each member visually recognized when viewed from the oblique upper left rear.

FIG. 2 is a perspective view showing cushion frame 4, representing each member visually recognized when viewed from the oblique upper left front. FIG. 3 is a perspective view showing cushion frame 4, representing each member visually recognized when viewed from the oblique upper left rear. Since frame assemblies 7L, 7R have substantially the same configuration as shown in FIGS. 1 to 3, the following description will focus on and discuss the configuration of frame assembly 7L.

Figure 4:
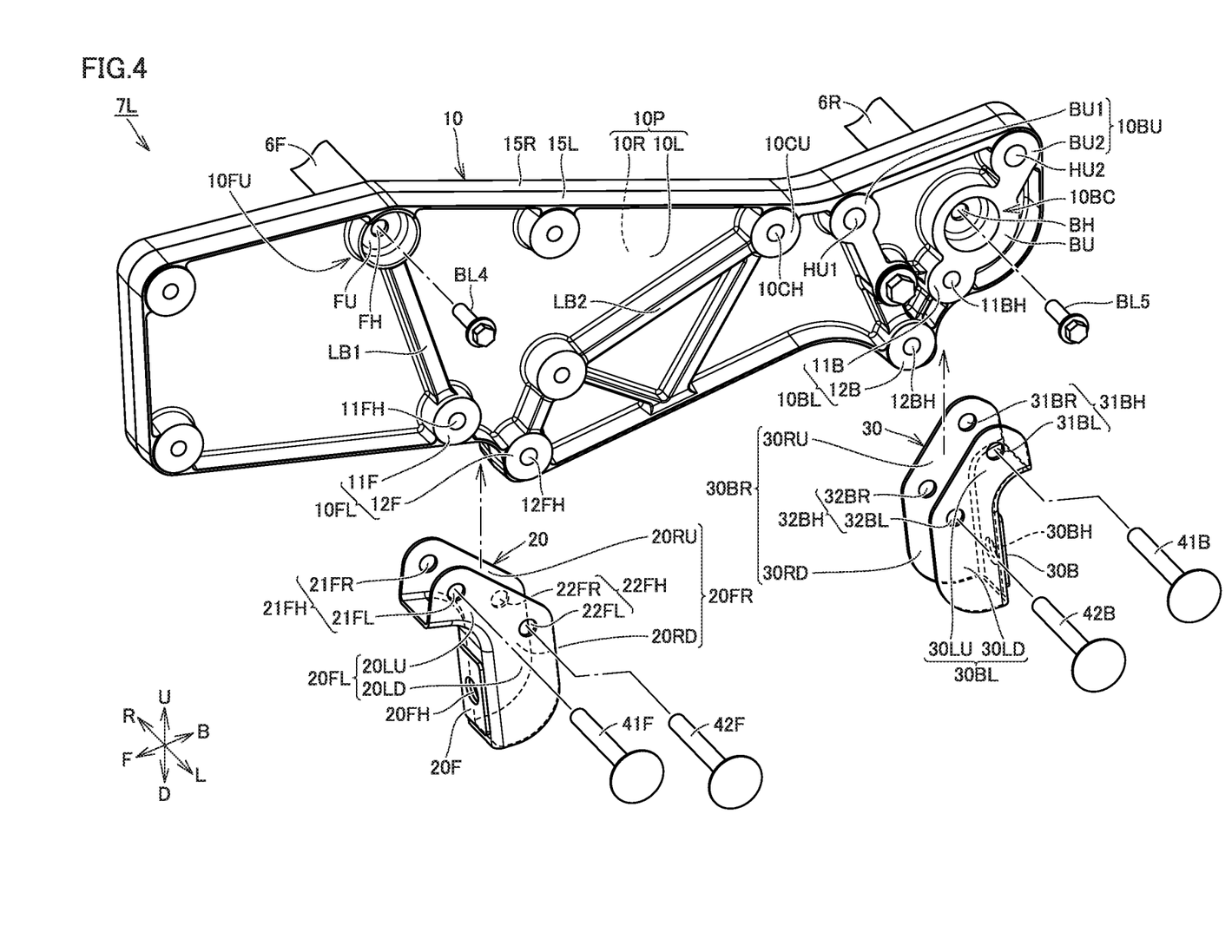
FIG. 4 is a perspective view showing a frame assembly 7L included in vehicle seat 100, in a disassembled state, representing each member visually recognized when viewed from the oblique upper left front.
Figure 5:
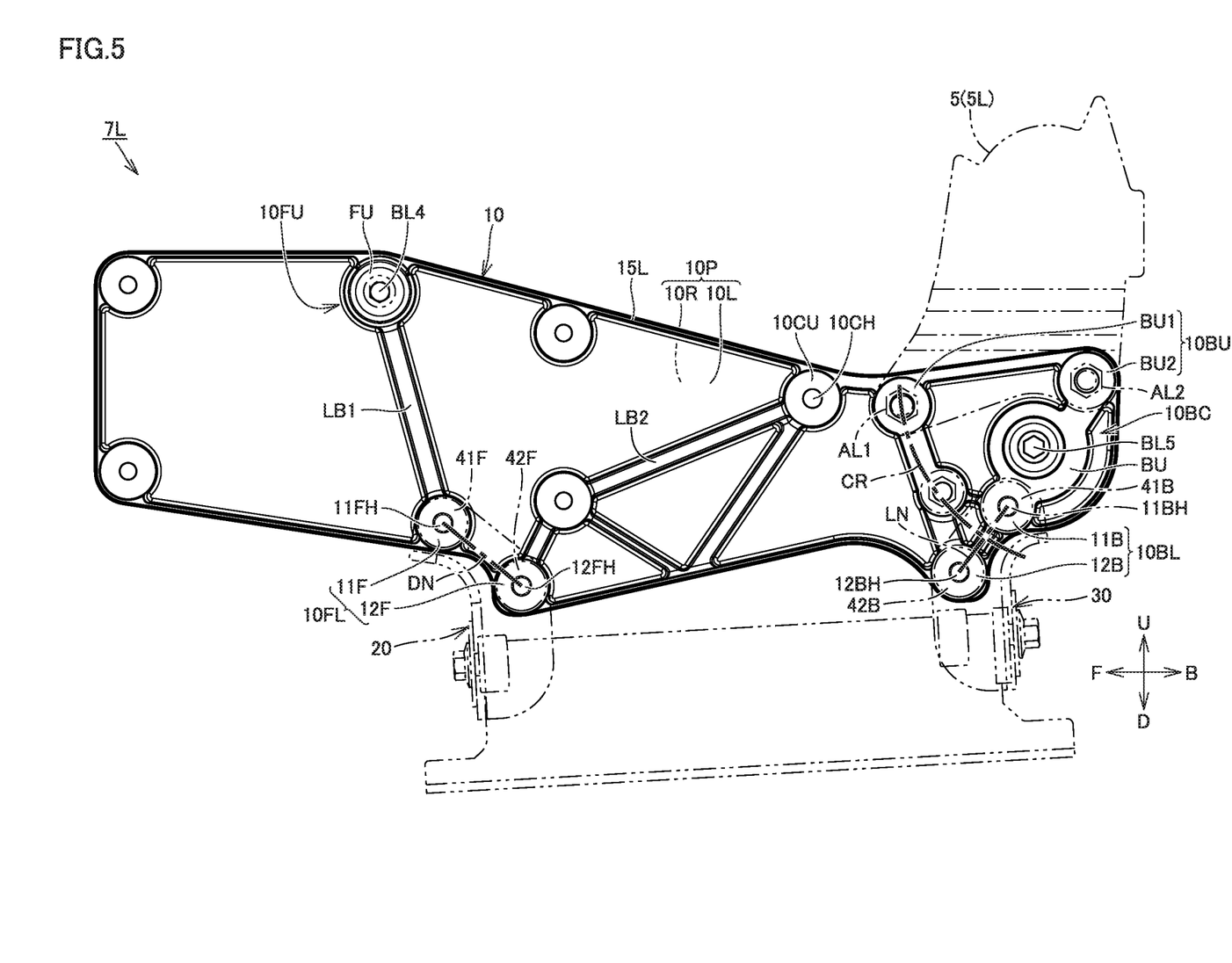
FIG. 5 is a side view showing a side frame 10 of frame assembly 7L included in vehicle seat 100.

FIG. 4 is a perspective view showing frame assembly 7L in a disassembled state, representing each member visually recognized when viewed from the oblique upper left front. FIG. 5 is a side view showing a side frame 10 of frame assembly 7L. As shown in FIGS. 2 to 5 (mainly FIG. 2), frame assembly 7L has side frame 10, a front leg 20 and a rear leg 30.

[Side Frame 10]

Side frame 10 is formed by a die casting process using aluminum, magnesium or an alloy thereof as a material, and is substantially in the shape of a plate extending along the forward and backward directions. Side frame 10 has a main plate portion 10P, annular flanges 15L, 15R, a front upper portion 10FU, a front lower portion 10FL, an anchor fastening portion 10CU, a rear upper portion 10BU, a rear central portion 10BC, a rear lower portion 10BL, and ribs LB1, LB2. These portions are all formed integrally with side frame 10 by die casting.

(Main Plate Portion 10P/Annular Flanges 15L, 15R)

Main plate portion 10P has an outer surface 10L and an inner surface 10R, and is generally formed as a plate. Outer surface 10L and inner surface 10R extend along the forward and backward directions, and are disposed to rise along the upward and downward directions.

Annular flanges 15L, 15R are formed around the entire perimeter of main plate portion 10P to surround the periphery of main plate portion 10P. Annular flange 15L is formed to protrude outward in the seat width direction from an outer edge of main plate portion 10P, and annular flange 15R is formed to protrude inward in the seat width direction from the outer edge of main plate portion 10P.

(Front Upper Portion 10FU/Front Frame Fastening Portion FU/Rib LB1)

Front upper portion 10FU is provided with a front frame fastening portion FU. Front frame fastening portion FU has a cylindrical shape with a closed end, and has a bottom disposed between a bolt BL4 (FIG. 4) and front frame 6F. A bolt hole FH is formed in the bottom of front frame fastening portion FU, and bolt BL4 inserted into bolt hole FH fastens a left end of front frame 6F to front frame fastening portion FU. Rib LB1 extends from the position of the cylindrically formed portion of front frame fastening portion FU in a direction toward front lower portion 10FL.

(Front Lower Portion 10FL/First Front Through Hole 11FH/Second Front Through Hole 12FH)

Front lower portion 10FL includes a pair of boss portions 11F, 12F. Boss portions 11F, 12F each have a cylindrical shape extending in the seat width direction, with a first from through hole 11FH formed within boss portion 11F, and a second front through hole 12FH formed within boss portion 12F. In the present embodiment, rib LB1 linearly extends between the cylindrically formed portion of front frame fastening portion FU and boss portion 11F to connect these portions.

(Anchor Fastening Portion 10CU/Rib LB2)

Anchor fastening portion 10CU is provided at a position in the upper part of main plate portion 10P and slightly backward with respect to the center in the forward and backward directions. Anchor fastening portion 10CU has a cylindrical shape extending in the seat width direction, with a bolt hole 10CH formed within anchor fastening portion 10CU. An anchor of a seat belt not shown in the figure is fastened into bolt hole 10CH. Rib LB2 (another rib) extends from the position of anchor fastening portion 10CU in the direction toward front lower portion 10FL.

As shown in FIG. 5, in side view of boss portions 11F, 12F in a direction parallel with the seat width direction, a line segment DN connecting the center of first front through hole 11FH and the center of second from through hole 12FH is drawn. In the present embodiment, rib LB2 (another rib) extends from the position of anchor fastening portion 10CU in the direction toward front lower portion 10FL, and if rib LB2 is imaginarily extended, the resulting extended line is configured to intersect line segment DN.

(Rear Central Portion 10BC/Rear Frame Fastening Portion BU)

Rear central portion 10BC is provided with a rear frame fastening portion BU. Rear frame fastening portion BU has a cylindrical shape with a closed end, and has a bottom disposed between a bolt BL5 (FIG. 4) and rear frame 6R. A bolt hole BH is formed in the bottom of rear frame fastening portion BU, and bolt BL5 inserted into boll hole BFI fastens a left end of rear frame 6R to rear frame fastening portion BU.

(Rear Lower Portion 10BL/First Rear Through Hole 11BH/Second Rear Through Hole 12BH)

Rear lower portion 10BL includes a pair of boss portions 11B, 12B. Boss portions 11B, 12B each have a cylindrical shape extending in the seat width direction, with a first rear through hole 11BH formed within boss portion 11B, and a second rear through hole 12BH formed within boss portion 12B.

(Rear Upper Portion 10BU)

Rear upper portion 10BU is provided with a first fastening portion BU1 and a second fastening portion BU2. First fattening portion BU1 is located in front of second fastening portion BU2. First fastening portion BU1 and second fastening portion BU2 each have a cylindrical shape extending in the seat width direction, with a boll hole HU1 formed within first fastening portion BU1, and holt hole HU2 formed within second fastening portion BU2.

Side frame 5L on back frame 5 side is provided with a pair of openings, through which bolls AL1, AL2 (FIG. 3) are screed into bolt holes HU1, HU2, respectively. Side frame 10 on cushion frame 4 side is fastened to side frame 5L on back frame 5 side through first fastening portion BU1 and second fastening portion BU2.

As shown in FIG. 5, in side view of first fastening portion BU1 and second fastening portion BU2 in the direction parallel with the seat width direction, an imaginary arc CR passing through first fastening portion BU1 and centered at second fastening portion BU2 is drawn, and a line segment LN connecting the center of first rear through hole 11BH and the center of second rear through hole 12BH is drawn. In the present embodiment, arc CR is configured to intersect line segment LN.

[Front Leg 20]

Front leg 20 is formed by press-molding a plate-like member made of metal such as iron. Front leg 20 is attached to front lower portion 10FL of side frame 10, and supports side frame 10 between from lower portion 10FL and vehicle floor surface 9F (FIG. 1). In this case, front leg 20 is provided between front lower portion 10FL and a front end of upper rail 8L.

Front leg 20 has a first front opening 21FH and a second front opening 22FH. First front opening 21FH provided in front leg 20 and first front through hole 11FH provided in front lower portion 10FL are coaxially disposed along the seat width direction, and second front opening 22FH provided in front leg 20 and second front through hole 12FH provided in front lower portion 10FL are coaxially disposed along the seat width direction.

A first front insertion member 41F is inserted into first front opening 21FH and first front through hole 11FH to secure front leg 20 to front lower portion 10FL. A second front insertion member 42F is inserted into second front opening 22FH and second front through hole 12FH, to secure front leg 20 to front lower portion 10FL. First front insertion member 41F and second front insertion member 42F may be formed of rivets and secured by the action of caulking by press-fitting, or may be formed of bolts and secured by being fastened.

Front leg 20 has a front wall portion 20F, a front outer wall portion 20FL extending backward from an outer portion of front wall portion 20F in the seal width direction, and a front inner wall portion 20FR extending backward from an inner portion of from wall portion 20F in the seat width direction. Front wall portion 20F, front outer wall portion 20FL and front inner wall portion 20FR are each in the shape of a plate.

Front wall portion 20F is parallel with the seat width direction. A bolt hole 20FH is formed in from wall portion 20F, and a bolt BL2 (FIGS. 2 and 3) inserted into bolt hole 20FH fastens front leg 20 to the front end of upper rail 8L (FIG. 1). Front outer wall portion 20FL and front inner wall portion 20FR are parallel with the forward and backward directions, and are spaced from and face each other. Front lower portion 10FL of side frame 10 is disposed between front outer wall portion 20FL and from inner wall portion 20FR.

First front opening 21FH is provided in both front outer wall portion 20FL and front inner wall portion 20FR. First front opening 21FH (21FL) provided in front outer wall portion 20FL and first front opening 21FH (21FR) provided in front inner wall portion 20FR are formed at coaxial positions in the seat width direction. First front insertion member 41F is inserted (in this case, press-fitted) successively into first front opening 21FH (21FL) provided in front outer wall portion 20FL, first front through hole 11FH provided in front lower portion 10FL, and first front opening 21FH (21FR) provided in front Inner wall portion 20FR.

Second front opening 22FH is also provided in both front outer wall portion 20FL and front inner wall portion 20FR. Second front opening 22FH (22FL) provided in front outer wall portion 20FL and second front opening 22FH (22FR) provided in front inner wall portion 20FR are formed at coaxial positions in the seat width direction. Second front insertion member 42F is inserted (in this case, press-fitted) successively into second front opening 22FH (22FL) provided in front outer wall portion 20FL, second front through hole 12FH provided in front lower portion 10FL, and second front opening 22FH (22FR) provided in front inner wall portion 20FR.

In the present embodiment, front outer wall portion 20FL of front leg 20 has a front rising portion 20LD provided on vehicle floor surface 9F (FIG. 1) side and extending along the vertical direction, and a front inclined portion 20LU provided above front rising portion 20LD and extending obliquely upward and forward. Similarly, front inner wall portion 20FR of front leg 20 has a front rising portion 20RD provided on vehicle floor surface 9F (FIG. 1) side and extending along the vertical direction, and a front inclined portion 20RU provided above front rising portion 20RD and extending obliquely upward and forward.

First front opening 21FH (21FL) is provided at a front portion of front inclined portion 20LU, and second front opening 22FH (22FL) is provided at a position between front inclined portion 20LU and front rising portion 20LD. Similarly, first front opening 21FH (21FR) is provided at a front portion of front inclined portion 20RU, and second front opening 22FH (22FR) is provided at a position between front inclined portion 20RU and front rising portion 20RD. That is, first front insertion member 41F is located obliquely above and in front of second front insertion member 42F.

[Rear Leg 30]

Rear leg 30 is formed by press-molding a plate-like member made of metal such as iron. Rear leg 30 is attached to rear lower portion 10BL of side frame 10, and supports side frame 10 between rear lower portion 10BL and vehicle floor surface 9F (FIG. 1). In this case, rear leg 30 is provided between rear lower portion 10BL and a rear end of upper rail 8L.

Rear leg 30 has a first rear opening 31BH and a second rear opening 32BH. First rear opening 31BH provided in rear leg 30 and first rear through hole 11BH provided in rear lower portion 10BL are coaxially disposed along the seat width direction, and second rear opening 32BH provided in rear leg 30 and second rear through hole 12BH provided in rear lower portion 10BL are coaxially disposed along the seat width direction.

A first rear insertion member 41B is inserted into first rear opening 31BH and first rear through hole 11BH, to secure rear leg 30 to rear lower portion 10BL. A second rear insertion member 42B is inserted into second rear opening 32BH and second rear through hole 12BH, to secure rear leg 30 to rear lower portion 10BL. First rear insertion member 41B and second rear insertion member 42B may be formed of rivets and secured by the action of caulking by press-fitting, or may be formed of bolts and secured by being fastened.

Rear leg 30 has a rear wall portion 30B, a rear outer wall portion 30BL extending forward from an outer portion of rear wall portion 30B in the seat width direction, and a rear inner wall portion 30BR extending forward from an inner portion of rear wall portion 30B in the seat width direction. Rear wall portion 30B, rear outer wall portion 30BL and rear inner wall portion 30BR are each in the shape of a plate.

Rear wall portion 30B is parallel with the seat width direction. A bolt hole 30BH is formed in rear wall portion 30B, and a bolt BL3 (FIGS. 2 and 3) inserted into bolt hole 30BH fastens rear leg 30 to a rear end of upper rail 8L (FIG. 1). Rear outer wall portion 30BL and rear inner wall portion 30BR are parallel with the forward and backward directions, and are spaced from and face each other. Rear lower portion 10BL of side frame 10 is disposed between rear outer wall portion 30BL and rear inner wall portion 30BR.

First rear opening 31BH is provided in both rear outer wall portion 30BL and rear inner wall portion 30BR. First rear opening 31BH (31BL) provided in rear outer wall portion 30BL and first rear opening 31BH (31BR) provided in rear inner wall portion 30BR are formed at coaxial positions in the seat width direction. First rear insertion member 41B is inserted (in this case, press-fitted) successively into first rear opening 31BH (31BL) provided in rear outer wall portion 30BL, first rear through hole 11BH provided in rear lower portion 10BL, and first rear opening 31BH (31BR) provided in rear inner wall portion 30BR.

Second rear opening 32BH is also provided in both rear outer wall portion 30BL and rear inner wall portion 30BR. Second rear opening 32BH (32BL) provided in rear outer wall portion 30BL and second rear opening 32BH (32BR) provided in rear inner wall portion 30BR are formed at coaxial positions in the seat width direction. Second rear insertion member 42B is inserted (in this case, press-fitted) successively into second rear opening 32BH (32BL) provided in rear outer wall portion 30BL, second rear through hole 12BH provided in rear lower portion 10BL, and second rear opening 32BH (32BR) provided in rear inner wall portion 30BR.

In the present embodiment, rear outer wall portion 30BL of rear leg 30 has a rear rising portion 30LD provided on vehicle floor surface 9F (FIG. 1) side and extending along the vertical direction, and a rear inclined portion 30LU provided above rear rising portion 30LD and extending obliquely upward and backward. Similarly, rear inner wall portion 30BR of rear leg 30 has a rear rising portion 30RD provided on vehicle floor surface 9F (FIG. 1) side and extending along the vertical direction, and a rear inclined portion 30RU provided above rear rising portion 30RD and extending obliquely upward and backward.

First rear opening 31BH (31BL) is provided at a rear portion of rear inclined portion 30LU, and second rear opening 32BH (32BL) is provided at a position between rear inclined portion 30LU and rear rising portion 30LD. Similarly, first rear opening 31BH (31BR) is provided at a rear portion of rear inclined portion 30RU, and second rear opening 32BH (32BR) is provided at a position between rear inclined portion 30RU and rear rising portion 30RD. That is, first rear insertion member 41B is located obliquely above and behind second rear insertion member 42B.

[Function and Effect]

(1) In vehicle seat 100, side frame 10 is formed by die casting, front leg 20 is attached to front lower portion 10FL of side frame 10, and rear leg 30 is attached to rear lower portion 10BL of side frame 10. Front leg 20 and rear leg 30 support side frame 10 on a member (in this case, upper rail 8L) on vehicle floor surface 9F side. Front leg 20 and rear leg 30 are members which are fabricated separately from side frame 10 formed by die casting and attached to side frame 10.

When a need arises to increase the strength (load capacity) in the specifications of cushion frame 4, for example, it is possible to address the need by changing the thickness or material of front leg 20 and rear leg 30, without having to change the configuration of side frame 10 itself, or with a minimum change in the configuration of side frame 10 itself. While aluminum and magnesium are commonly used for die casting formation, if front leg 20 and rear leg 30 are made of a metallic material such as iron, the strength can be increased more readily (for example, with less space) than when they are formed by die casting.

Alternatively, when a need arises to change the height position of cushion frame 4, it is similarly possible to address the need by changing the shape, height, size and the like of front leg 20 and rear leg 30, without having to change the configuration of side frame 10 itself, or with a minimum change in the configuration of side frame 10 itself. Thus, according to vehicle seat 100 of the present embodiment, it is possible to flexibly adapt to a specification change, such as improving the strength, of portions (in this case, from leg 20 and rear leg 30) of cushion frame 4 that are fastened to a member on the vehicle side. This concept is also applicable to using side frame 10 commonly to numerous types of vehicle seats, and preparing only front leg 20 and rear leg 30 adapted to the specifications of each vehicle seat, to thereby reduce the cost of manufacturing the vehicle seats. If front leg 20 and rear leg 30 are made of a metallic material such as iron, it can be expected that the manufacturing cost will be further reduced than when front leg 20 and rear leg 30 are formed integrally with side frame 10 by die casting.

(2) In vehicle seat 100, first front insertion member 41F is inserted into first front opening 21FH in front leg 20 and first front through hole 11FH in front lower portion 10FL, and second front insertion member 42F is inserted into second front opening 22FH in front leg 20 and second front through hole 12FH in front lower portion 10FL. Front leg 20 is thereby secured to front lower portion 10FL. This configuration not only substantially prevents the rotation of front leg 20 with respect to side frame 10, but also allows for distribution of a load inputted to front leg 20 from side frame 10. Such function and effect can be similarly obtained for rear leg 30 as well.

(3) In vehicle seat 100, front leg 20 has front wall portion 20F, front outer wall portion 20FL and front inner wall portion 20FR. First front insertion member 41F is inserted successively into first front opening 21FH (21FL) provided in front outer wall portion 20FL, first front through hole 11FH provided in front lower portion 10FL, and first front opening 21FH (21FR) provided in front inner wall portion 20FR. Second front insertion member 42F is inserted successively into second front opening 22FH (22FL) provided in front outer wall portion 20FL, second front through hole 12FH provided in front lower portion 10FL, and second front opening 22FH (22FR) provided in front inner wall portion 20FR. According to this configuration, front lower portion 10FL of side frame 10 can be supported in a balanced and stable manner in the rightward and leftward directions. Such function and effect can be similarly obtained for rear leg 30 as well.

(4) In vehicle seat 100, front outer wall portion 20FL and front inner wall portion 20FR of front leg 20 have front rising portions 20LD, 20RD, and front inclined portions 20LU, 20RU extending obliquely upward and forward, first front opening 21FH is provided at the front portions of front inclined portions 20LU, 20RU, and second front opening 22FH is provided at the positions between front inclined portions 20LU, 20RU and front rising portions 20LD, 20RD. First front insertion member 41F is located obliquely above and in front of second front insertion member 42F. Upon the occurrence of a front-end collision, for example, a load in a forward and downward direction tends to act on front lower portion 10FL of cushion frame 4 (frame assembly 7L). According to the configuration described above, first front insertion member 41F and second front insertion member 42F are aligned in a direction intersecting at an angle close to 90° the direction of such load action, so that such a load can be efficiently received.

Similarly, as to rear leg 30 side, first rear insertion member 41B is located obliquely above and behind second rear insertion member 42B. Upon the occurrence of a front-end collision, for example, a load in a forward and upward direction tends to act on rear lower portion 10BL of cushion frame 4 (frame assembly 7L). According to the configuration described above, first rear insertion member 41B and second rear insertion member 42B are aligned in a direction intersecting at an angle close to 90° the direction of such load action, so that such a load can be efficiently received.

(5) in vehicle seat 100 (FIG. 5), in side view of first fastening portion BU1 and second fastening portion BU2 in the direction parallel with the seat width direction, if imaginary arc CR passing through first fastening portion BU1 and centered at second fastening portion BU2 is drawn, and line segment LN connecting the center of first rear through hole 11BH and the center of second rear through hole 12BH is drawn, arc CR is configured to intersect line segment LN. A load that causes back frame 5 (side frame 5L) to fall backward may act on back frame 5. Upon the occurrence of such a load, first fastening portion Mil is going to rotate clockwise in the sheet of FIG. 5 relative to second fastening portion BU2. Since boss portions 11B, 12B of rear lower portion 10BL are aligned in a direction intersecting at an angle close to 90° the direction of force generated by the relative rotation of first fastening portion BU1, such a force can be efficiently received.

(6) In vehicle seat 100, rib LB1 extends from the position of front frame fastening portion FU in the direction toward front lower portion 10FL. Upon the occurrence of a front-end collision for example, a load in a downward direction tends to act on front frame 6F of cushion frame 4. According to the configuration described above, upon the occurrence of such a load, the vehicle can efficiently bear such a load through rib LB1, front lower portion 10FL and front leg 20.

(7) In vehicle seat 100, rib LB2 (another rib) extends from the position of anchor fastening portion 10CU in the direction toward front lower portion 10FL. Upon the occurrence of a front-end collision, for example, a load in an obliquely upward and backward direction tends to act on anchor fastening portion 10CU. According to the configuration described above, upon the occurrence of such a load, the vehicle can efficiently bear such a load through rib LB2, front lower portion 10FL and front leg 20.

A summary of contents of the present disclosure described above is given as follows.

A vehicle seat based on the present disclosure includes: a side frame formed by filling a mold with a material, the side frame extending along forward and backward directions and having a front lower portion and a rear tower portion; a front leg attached to the front lower portion of the side frame to support the side frame between the front lower portion and a vehicle floor surface; and a rear leg attached to the rear lower portion of the side frame to support the side frame between the rear lower portion and the vehicle floor surface.

In the vehicle seat described above, the front lower portion may have a first front through hole and a second front through hole, the front leg may have a first front opening and a second front opening, and the vehicle seat may further include: a first front insertion member inserted into the first front opening and the first front through hole to secure the front leg to the front lower portion; and a second front insertion member inserted into the second front opening and the second front through hole to secure the front leg to the front lower portion.

In the vehicle seat described above, the front leg may have a front wall portion, a front outer wall portion extending backward from an outer portion of the front wall portion in a seat width direction, and a front inner wall portion extending backward from an inner portion of the front wall portion in the seat width direction, with the front lower portion of the side frame disposed between the front outer wall portion and the front inner wall portion, the first front opening may be provided in both the front outer wall portion and the front inner wall portion, the second front opening may be provided in both the front outer wall portion and the front inner wall portion, the first front insertion member may be inserted successively into the first front opening provided in the front outer wall portion, the first front through hole provided in the front lower portion, and the first front opening provided in the front inner wall portion, and the second front insertion member may be inserted successively into the second front opening provided in the front outer wall portion, the second front through hole provided in the front lower portion, and the second front opening provided in the front inner wall portion.

In the vehicle seat described above, each of the front outer wall portion and the front inner wall portion may have a front rising portion provided on the vehicle floor surface side and extending along a vertical direction, and a front inclined portion provided above the front rising portion and extending obliquely upward and forward, the first front opening may be provided at a front portion of the front inclined portion, and the second front opening may be provided at a position between the front inclined portion and the front rising portion.

In the vehicle seat described above, the rear lower portion may have a first rear through hole and a second rear through hole, the rear leg may have a first rear opening and a second rear opening, and the vehicle seat may further include: a first rear insertion member inserted into the first rear opening and the first rear through hole to secure the rear leg to the rear lower portion; and a second rear insertion member inserted into the second rear opening and the second rear through hole to secure the rear leg to the rear lower portion.

In the vehicle seat described above, the rear leg may have a rear wall portion, a rear outer wall portion extending forward from an outer portion of the rear wall portion in a seat width direction, and a rear inner wall portion extending forward from an inner portion of the rear wall portion in the seat width direction, with the rear lower portion of the side frame disposed between the rear outer wall portion and the rear inner wall portion, the first rear opening may be provided in both the rear outer wall portion and the rear inner wall portion, the second rear opening may be provided in both the rear outer wall portion and the rear inner wall portion, the first rear insertion member may be inserted successively into the first rear opening provided in the rear outer wall portion, the first rear through hole provided in the rear lower portion, and the first rear opening provided in the rear inner wall portion, and the second rear insertion member may be inserted successively into the second rear opening provided in the rear outer wall portion, the second rear through hole provided in the rear lower portion, and the second rear opening provided in the rear inner wall portion.

In the vehicle seat described above, each of the rear outer wall portion and the rear inner wall portion may have a rear rising portion provided on the vehicle floor surface side and extending along a vertical direction, and a rear inclined portion provided above the rear rising portion and extending obliquely upward and backward, the first rear opening may be provided at a rear portion of the rear inclined portion, and the second rear opening may be provided at a position between the rear inclined portion and the rear rising portion.

In the vehicle seat described above, the side frame may have a rear upper portion, the side frame may be fastened to a side frame on a seat back side through a first fastening portion and a second fastening portion provided at the rear upper portion, the first fastening portion may be located in front of the second fastening portion, and in side view of the first fastening portion and the second fastening portion in a direction parallel with the seat width direction, when an imaginary arc passing through the first fastening portion and centered at the second fastening portion is drawn, and a line segment connecting a center of the first rear through hole and a center of the second rear through hole is drawn, the arc may intersect the line segment.

In the vehicle seat described above, the side frame may have a front frame fastening portion to which a front frame is fastened, and a rib extending from a position of the front frame fastening portion in a direction toward the front lower portion.

In the vehicle seat described above, the side frame may have an anchor fastening portion to which an anchor of a seat belt is fastened, and a rib extending from a position of the anchor fastening portion in a direction toward the front lower portion.

According to the vehicle seat having the configuration described above, the front leg and the rear leg which are portions of the vehicle seat that are fastened to a member on the vehicle side are configured as members separate from the side frame formed by die casting. It is thus possible to flexibly adapt to a specification change, such as improving the strength, of the front leg and the rear leg.

While the side frame is manufactured by a die casting process using aluminum, magnesium or an alloy thereof as a material in the embodiment described above, the side frame and the like may be manufactured by an injection molding process using a synthetic resin as a material.

Although the embodiments of the present disclosure have been described and illustrated in detail, it is clearly understood that the same is by way of illustration and example only and is not to be taken by way of limitation. It is therefore intended that the scope of the present invention is defined by claims, and encompasses all modifications and variations equivalent in meaning and scope to the claims.

What is claimed is:

1. A vehicle seat comprising:
a side frame formed by filling a mold with a material, the side frame extending along forward and backward directions and having a front lower portion and a rear lower portion;
a front leg attached to the front lower portion of the side frame to support the side frame between the front lower portion and a vehicle floor surface; and
a rear leg attached to the rear lower portion of the side frame to support the side frame between the rear lower portion and the vehicle floor surface, wherein
the front lower portion has a first front through hole and a second front through hole,
the front leg has a first front opening and a second front opening, and
the vehicle seat further comprises:
a first front insertion member inserted into the first front opening and the first front through hole to secure the front leg to the front lower portion; and
a second front insertion member inserted into the second front opening and the second front through hole to secure the front leg to the front lower portion, wherein
the front leg has a front wall portion, a front outer wall portion extending backward from an outer portion of the front wall portion in a seat width direction, and a front inner wall portion extending backward from an inner portion of the front wall portion in the seat width direction, with the front lower portion of the side frame disposed between the front outer wall portion and the front inner wall portion,
the first front opening is provided in both the front outer wall portion and the front inner wall portion,
the second front opening is provided in both the front outer wall portion and the front inner wall portion,
the first front insertion member is inserted successively into the first front opening provided in the front outer wall portion, the first front through hole provided in the front lower portion, and the first front opening provided in the front inner wall portion, and
the second front insertion member is inserted successively into the second front opening provided in the front outer wall portion, the second front through hole provided in the front lower portion, and the second front opening provided in the front inner wall portion.

2. The vehicle seat according to claim 1, wherein
each of the front outer wall portion and the front inner wall portion has a front rising portion provided on the vehicle floor surface side and extending along a vertical direction, and a front inclined portion provided above the front rising portion and extending obliquely upward and forward,
the first front opening is provided at a front portion of the front inclined portion, and
the second front opening is provided at a position between the front inclined portion and the front rising portion.

3. The vehicle seat according to claim 1, wherein
the rear lower portion has a first rear through hole and a second rear through hole,
the rear leg has a first rear opening and a second rear opening, and
the vehicle seat further comprises:
a first rear insertion member inserted into the first rear opening and the first rear through hole to secure the rear leg to the rear lower portion; and
a second rear insertion member inserted into the second rear opening and the second rear through hole to secure the rear leg to the rear lower portion.

4. The vehicle seat according to claim 3, wherein
the rear leg has a rear wall portion, a rear outer wall portion extending forward from an outer portion of the rear wall portion in a seat width direction, and a rear inner wall portion extending forward from an inner portion of the rear wall portion in the seat width direction, with the rear lower portion of the side frame disposed between the rear outer wall portion and the rear inner wall portion,
the first rear opening is provided in both the rear outer wall portion and the rear inner wall portion,
the second rear opening is provided in both the rear outer wall portion and the rear inner wall portion,
the first rear insertion member is inserted successively into the first rear opening provided in the rear outer wall portion, the first rear through hole provided in the rear lower portion, and the first rear opening provided in the rear inner wall portion, and the second rear insertion member is inserted successively into the second rear opening provided in the rear outer wall portion, the second rear through hole provided in the rear lower portion, and the second rear opening provided in the rear inner wall portion.

5. The vehicle seat according to claim 4, wherein
each of the rear outer wall portion and the rear inner wall portion has a rear rising portion provided on the vehicle floor surface side and extending along a vertical direction, and a rear inclined portion provided above the rear rising portion and extending obliquely upward and backward,
the first rear opening is provided at a rear portion of the rear inclined portion, and
the second rear opening is provided at a position between the rear inclined portion and the rear rising portion.

6. The vehicle seat according to claim 5, wherein
the side frame has a rear upper portion,
the side frame is fastened to a side frame on a seat back side through a first fastening portion and a second fastening portion provided at the rear upper portion,
the first fastening portion is located in front of the second fastening portion, and
in side view of the first fastening portion and the second fastening portion in a direction parallel with the seat width direction, when an imaginary arc passing through the first fastening portion and centered at the second fastening portion is drawn, and a line segment connecting a center of the first rear through hole and a center of the second rear through hole is drawn, the arc intersects the line segment.

7. The vehicle seat according to claim 1, wherein
the side frame has
a front frame fastening portion to which a front frame is fastened, and
a rib extending from a position of the front frame fastening portion in a direction toward the front lower portion.

8. The vehicle seat according to claim 1, wherein
the side frame has
an anchor fastening portion to which an anchor of a seat belt is fastened, and
a rib extending from a position of the anchor fastening portion in a direction toward the front lower portion.

* * * * *